United States Patent
Hinkel et al.

(10) Patent No.: US 6,283,212 B1
(45) Date of Patent: Sep. 4, 2001

(54) METHOD AND APPARATUS FOR DELIBERATE FLUID REMOVAL BY CAPILLARY IMBIBITION

(75) Inventors: Jerald J. Hinkel; Kevin W. England, both of Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/298,771

(22) Filed: Apr. 23, 1999

(51) Int. Cl.[7] .............................. E21B 43/16; E21B 43/17; E21B 43/26
(52) U.S. Cl. .......................... 166/279; 166/281; 507/921
(58) Field of Search ..................... 166/279, 280, 166/281, 283; 507/921, 202, 277

(56) References Cited

U.S. PATENT DOCUMENTS

| | | | |
|---|---|---|---|
| 3,709,300 | * 1/1973 | Pye | 166/280 |
| 3,933,205 | 1/1976 | Kiel | 166/308 |
| 4,389,320 | * 6/1983 | Clampitt | 252/8.55 R |
| 4,442,897 | * 4/1984 | Crowell | 166/280 |
| 5,247,993 | 9/1993 | Sarem et al. . | |
| 5,411,086 | 5/1995 | Burchman et al. . | |
| 5,411,094 | * 5/1995 | Northrop | 166/303 |
| 5,806,597 | * 9/1998 | Tjon-Joe-Pin et al. | 166/300 |
| 5,875,843 | 3/1999 | Hill | 166/250 |
| 5,960,880 | * 10/1999 | Nguyen et al. | 166/280 |
| 5,964,289 | 10/1999 | Hill | 166/250.1 |

OTHER PUBLICATIONS

SPE 20259 "Imbibition in Low–Permeability Porous Media: Understanding and Improvement of Oil Recovery", Cuiec, et al, Apr. 1990.

SPE 24880 "A Pore–Level Scenario for the Development of Mixed Wettability in Oil Reservoirs", Radke, et al, Oct. 1992.

SPE 49043 "Results of Using a Relative–Permeability Modifier with a Fracture–Stimulation Treatment", Dalrymple, et al, Sep. 1998.

Anyx et al, "Properties of Porous Media Containing Multiple Fluid Saturations", Petroleum Reservoir Engineering, Chap. 3, pp. 133–210.

Greenhorn, et al, "Flow Phenomena in Porous Media", pp. 118–123.

Petition to Make Special in Reference to the Application of Jerald J. Hinkel and Kevin W. England, Schlumberger Technology Corporations Docket No. 56.0475 (4 pages with Appendices A–D).

SPE 49005, "An Examination of Countercurrent Capillary Imbibition Recovery from Single Matrix Blocks and Recovery Predictions by Analytical Matrix/Fracture Transfer Functions", Murat, et al, Sep. 1998.

SPE 49007, "Modeling the Diffusion Flux Between Matrix and Fissure in a Fissured Reservoir", Lenormand, et al, Sep. 1998.

* cited by examiner

Primary Examiner—William Neuder
Assistant Examiner—Jennifer M Hawkins
(74) Attorney, Agent, or Firm—Douglas Y'Barbo; Robin C. Nava; Thomas O. Mitchell

(57) ABSTRACT

The present Invention relates to hydrocarbon well stimulation, and more particularly to methods and compositions to remove (or more generally to transfer) fluid introduced into the subsurface. For instance, preferred methods involve creating then exploiting a capillary pressure gradient at the fracture face to induce fluid flow from the fracture into the formation thereby increasing effective fracture length, and then improving fracture conductivity.

22 Claims, 3 Drawing Sheets

METHOD AND APPARATUS FOR DELIBERATE FLUID REMOVAL BY CAPILLARY IMBIBITION

BACKGROUND OF THE INVENTION

1. Technical Field of the Invention

The present Invention relates to hydrocarbon well stimulation, and more particularly to methods and compositions to remove (and more generally to transfer) fluid deliberately introduced into the subsurface. For instance, the methods and compositions of the present invention involve creating then exploiting a capillary pressure gradient at the fracture face to systematically induce fluid flow from the fracture into the formation (or from the formation into the fracture), thereby increasing effective fracture length, hence, improving conductivity.

This Application is one member of a family of patent applications by Hinkel and England, the Inventors of the present Invention, and assigned to Schlumberger Technology Corporation. The common feature of these Applications is that they are all directed to transferring fluids in the subsurface by non-hydraulic means. The other Applications in this family are, Enhancing Fluid Removal From Subsurface Fractures Deliberately Introduced Into the Subsurface, U.S. patent application Ser. No. 09/087,286; and, Novel Fluids and Techniques for Maximizing Fracture Fluid Clean-up, U.S. patent application Ser. No. 09/216,420. Each of these Applications is incorporated by reference in its entirety into the present Application.

2. The Prior Art

The present Invention relates generally to hydrocarbon (petroleum and natural gas) production from wells drilled in the earth. Obviously, it is desirable to maximize both the rate of flow and the overall capacity of hydrocarbon from the subsurface formation to the surface, where it can be recovered. One set of techniques to do this is referred to as "stimulation" and one such technique, "hydraulic fracturing," is the primary, though not the exclusive subject of the present Invention.

The rate of flow or "production" of hydrocarbon from a geologic formation is naturally dependent on numerous factors. One of these factors is the radius of the borehole; as the bore radius increases, the production rate increases, everything else being equal. Another, related to the first, is the flowpaths available to the migrating hydrocarbon.

Drilling a hole in the subsurface is expensive—which limits the number of wells that can be economically drilled—and this expense only generally increases as the size of the hole increases. Additionally, a larger hole creates greater instability to the geologic formation, thus increasing the chances that the formation will shift around the wellbore and therefore damage the wellbore (and at worse collapse). So, while a larger borehole will, in theory, increase hydrocarbon production, it is impractical, and there is a significant downside. Yet, a fracture or large crack within the producing zone of the geologic formation, originating from and radiating out from the wellbore, can actually increase the "effective" (as opposed to "actual") wellbore radius, thus, the well behaves (in terms of production rate) as if the entire wellbore radius were much larger. Hence, the hydrocarbon can move from the formation into and along or within the fracture and more easily to the wellbore.

Fracturing (generally speaking, there are two types, acid fracturing and propped fracturing, the latter of primary interest here) thus refers to methods used to stimulate the production of fluids resident in the subsurface, e.g., oil, natural gas, and brines. Hydraulic fracturing involves literally breaking or fracturing a portion of the surrounding strata, by injecting a specialized fluid into the wellbore directed at the face of the geologic formation at pressures sufficient to initiate and extend a fracture in the formation (i.e. above the minimum insitu rock stress). More particularly, a fluid is injected through a wellbore; the fluid exits through holes (perforations in the well casing) and is directed against the face of the formation (sometimes wells are completed openhole where no casing and therefore no perforations exist so the fluid is injected through the wellbore and directly to the formation face) at a pressure and flow rate sufficient to overcome the minimum insitu stress (also known as minimum principal stress) to initiate and/or extend a fracture(s) into the formation. Actually, what is created by this process is not always a single fracture, but a fracture zone, i.e., a zone having multiple fractures, or cracks in the formation, through which hydrocarbon can more easily flow to the wellbore.

In practice, fracturing a well is a highly complex operation performed with precise and exquisite orchestration of equipment, highly skilled engineers and technicians, and powerful integrated computers that monitor rates, pressures, volumes, etc. in real time. During a typical fracturing job, tens of thousands of gallons of materials are pumped into the formation at pressures high enough to actually split the formation in two, thousands of feet below the earth's surface.

A typical fracture zone is shown in context, in FIG. 1. The actual wellbore—or hole in the earth into which pipe is placed through which the hydrocarbon flows up from the hydrocarbon-bearing formation to the surface—is shown at 10, and the entire fracture zone is shown at 20. The vertical extent of the hydrocarbon-producing zone is ideally (but not generally) coextensive with the fracture-zone height (by design). These two coextensive zones are shown bounded by 22 and 24. The fracture is usually created in the producing zone of interest (rather than another geologic zone) because holes or perforations, 26–36, are deliberately created in the well casing beforehand; thus the fracturing fluid flows down (vertically) the wellbore and exits through the perforations. Again, the reservoir does not necessarily represent a singular zone in the subterranean formation, but may, rather represent multiple zones of varying dimensions.

Thus, once the well has been drilled, fractures are often deliberately introduced in the formation, as a means of stimulating production, by increasing the effective wellbore radius. Clearly then, the longer the fracture, the greater the effective wellbore radius. More precisely, wells that have been hydraulically fractured exhibit both radial flow around the wellbore (conventional) and linear flow from the hydrocarbon-bearing formation to the fracture, and further linear flow along the fracture to the wellbore. Therefore, hydraulic fracturing is a common means to stimulate hydrocarbon production in low permeability formations. In addition, fracturing has also been used to stimulate production in high permeability formations. Obviously, if fracturing is desirable in a particular instance, then it is also desirable, generally speaking, to create as large (i.e., long) a fracture zone as possible—e.g., a larger fracture means an enlarged flowpath from the hydrocarbon migrating towards the wellbore and to the surface.

Yet many wells behave as though the fracture length were much shorter because the fracture is contaminated with fracturing fluid (i.e., more particularly, the fluid used to deliver the proppant as well as a fluid used to create the fracture, both of which shall be discussed below). The most difficult portion of the fluid to recover is that retained in the fracture tip—i.e. the distant-most portion of the fracture from the wellbore. Thus, the result of stagnant fracturing fluid in the fracture naturally diminishes the recovery of hydrocarbons. The reasons for this are both simple and complex. Most simply, the presence of fluid in the fracture acts as a barrier to the migration of hydrocarbon from the formation into the fracture. More precisely, the aqueous-based fluid saturates the pore spaces of the fracture face, preventing the migration of hydrocarbon into the same pore spaces, i.e., that fluid-saturated zone has zero permeability to hydrocarbon.

Indeed, diminished effective fracture length caused by stagnant fluid retained in the fracture tip is perhaps the most significant variables limiting hydrocarbon production (both rate and capacity) from a given well. This is particularly true for low permeability reservoirs (approx. <50 millidarcys). The significance of this stagnant fluid on well productivity is evidenced by the empirical observation well known to the skilled reservoir engineer that effective fracture lengths (the true fracture length minus the distal portion of the fracture saturated with fracturing fluid) are generally much less than the true hydraulically-induced fracture length. To achieve an increase in effective fracture length—so that it approaches the true fracture length—therefore involves removing stagnant fracturing fluid from the fracture particularly the tip.

The deliberate removal of fracturing fluid from the fracture is known as "clean-up," i.e., this term refers to recovering the fluid once the proppant has been delivered to the fracture. The current state-of-the-art method for fracture clean-up involves very simply, pumping or allowing the fluid to flow out of the fracture—thus the fracture fluid residing in the tip must traverse the entire length of the fracture (and up the wellbore) to be removed from the fracture. The present Application is directed in part to an improved method—and compositions to execute that method—for clean-up of the fracture.

The most difficult task related to fracture clean-up is to remove the stagnant fracture fluid retained in the fracture tip (i.e., farthest from the wellbore). Often, a portion of the fracture may be hydraulically isolated, or "cut-off" so that the hydrocarbon flowing from the formation into the fracture completely bypasses this tip region, as shown in FIG. 2. Ground level is shown at S. The direction of hydrocarbon flow is shown at 38. Thus hydrocarbon flows—aided by the presence of the newly created fracture from the formation 40 into the fracture 42—traverses the fracture until it gets to wellbore 10 where it is recovered at the surface. A similar flowpath is shown at 44. These flowpaths can define two regions 46, a producing region, and 48, a nonproducing region at the fracture tip that is isolated from the rest of the fracture since no hydrocarbon flows through this portion of the fracture, thus no pressure gradient exists. This phenomenon (in addition to others) ensures that the stagnant fracture fluid will remain in the fracture tip rather than being displaced by producing hydrocarbon, which can occur in the region shown at 46.

Generally speaking, creating a fracture in a hydrocarbon-bearing formation requires a complex suite of materials. In the case of conventional fracture treatments, five crucial components are required: a carrier fluid (usually water or brine), a polymer, a cross-linker, a proppant, and a breaker. (Numerous other components are sometimes added, e.g. fluid loss agents, whose purpose is to control leak-off, or migration of the fluid into the fracture face.) The first three component are injected first, and actually creates/extends the fracture. Roughly, the purpose of these fluids is to first create/extend the fracture, then once it is opened sufficiently, to deliver proppant into the fracture, which keeps the fracture from closing once the pumping operation is completed. The carrier fluid is simply the means by which the proppant and breaker (breaker can also be added to the fluid used to create/extend the fracture and commonly is) are carried into the formation. Thus, the fracturing fluid is typically prepared by blending a polymeric gelling agent with an aqueous solution (sometimes oil-based, sometimes a multi-phase fluid is desirable); often, the polymeric gelling agent is a solvatable polysaccharide, e.g., galactomannan gums, glycomannan gums, and cellulose derivatives. The purpose of the solvatable (or hydratable) polysaccharides is: (1) to provide viscosity to the fluid so that in can create/extend the fracture; and (2) to thicken the aqueous solution so that solid particles known as "proppant" (discussed below) can be suspended in the solution for delivery into the fracture. Again, the purpsoe of the proppant is to literally hold open or prop open the fracture after it has been created. Thus the polysaccharides function as viscosifiers, that is, they increase the viscosity of the aqueous solution by 10 to 100 times, or even more. In many fracturing treatments, a cross-linking agent is added which further increases the viscosity of the solution by cross-linking the polymer. The borate ion has been used extensively as a crosslinking agent for hydrated guar gums and other galactomannans to form aqueous gels, e.g., U.S. Pat. No. 3,059,909. Other demonstrably suitable cross-linking agents include: titanium (U.S. Pat. No. 3,888,312), chromium, iron, aluminum and zirconium (U.S. Pat. No. 3,301,723).

The purpose of the proppant is to keep the newly fractured formation in that fractured state, i.e., from re-closing after the fracturing process is completed; thus, it is designed to keep the fracture open—in other words to provide a permeable path (along the fracrture) for the hydrocarbon to flow through the fracture and into the wellbore. More specifically, the proppant provides channels within the fracture through which the hydrocarbon can flow into the wellbore and therefore be withdrawn or "produced." Typical material from which the proppant is made includes sand (e.g. 20–40 mesh), bauxite, man-made intermediate-strength materials and glass beads. The proppant can also be coated with resin (which causes the resin particles to stick to one another) to help prevent proppant flowback in certain applications. Thus, the purpose of the fracturing fluid generally is two-fold: (1) to create or extend an existing fracture through high-pressure introduction into the geologic formation of interest; and (2) to simultaneously deliver the proppant into the fracture void space so that the proppant can create a permanent channel through which the hydrocarbon can flow to the wellbore. Once this second step has been completed, it is desirable to remove the fracturing fluid (minus the proppant) from the fracture—its presence in the fracture is deleterious, since it plugs the fracture and therefore impedes the flow hydrocarbon. This effect is naturally greater in high permeability formations, since the fluid can readily fill the (larger) void spaces. This contamination of the fracture by the fluid is referred to as decreasing the effective fracture length. And the process of removing the fluid from the fracture once the proppant has been delivered is referred to as "fracture clean-up." For this, the final component of the fracture fluid becomes relevant: the breaker. The purpose of the breaker is to lower the viscosity of the fluid so that it is more easily removed fracture. Nevertheless, no completely satisfactory method exists to recover the fluid, and therefore prevent it from reducing the effective fracture length. Again, fluid recovery after delivering the proppant to the fracture represents one of the major technological dilemmas in the oilfield services field. The instant Invention is directed primarily to methods for recovering the fracturing fluid once the fluid has successfully delivered the proppant to the fracture.

Diminished effective fracture length (EFL) caused by fracture fluid retention in the fracture is an empirically demonstrable problem that results in substantially reduced well yields. The EFL can be calculated by production decline and pressure transient analysis; values obtained this way can then be compared with the true fracture length obtained using standard geometry models. EFL values of about one-half of the actual fracture length are common.

Essentially, techniques for fracture clean-up, which again, refers to recovering the proppant-less fluid from the fracture, often involves reducing the fluid's viscosity as much as practicable so that it more readily flows back towards the wellbore. Again, the goal is to recover as much fluid as possible, since fluid left in the fracture reduces the effective fracture length. Among the most troublesome aspect of fluid recovery, or clean-up is recovering that portion of the fluid at the very tip of the fracture.

The methods for fracture fluid clean-up taught in the prior art all involve removing the fracturing fluid through the same route by which the fluid was introduced into the fracture—i.e., by flowing or pumping the fluid back through the wellbore then to the surface where it is removed. The disadvantages of this method are obvious. For one thing, the fluid must traverse the entire length of the fracture—a distance often over 1000 feet in low permeability formations. Moreover, clean-up this way is expensive and time-consuming, and rarely results in effective clean-up, i.e., fluid often remains in the fracture tip, thus decreasing the effective fracture length. Indeed the time-honored empirical observation is that the effective fracture length is about 50 to 60% of the fracture length—after clean-up. The method of the present Invention is directed to a method of fluid removal not involving traversal of the fracture length and up the wellbore. Instead, the fluid is removed according to the present Invention by inducing fluid flow into the fracture faces or orthogonal to the conventional flowpath.

Although the system of the present Invention is novel in the art, others have disclosed the movement of fluids in subsurface environments by other non-hydraulic means, though not in a fracturing context. Eric van Oort, et al. at Shell in a series of SPE papers and U.S. Pat. No. 5,686,396, have investigated the problem of shale destabilization during drilling. E.g.: Eric van Oort, et al., Physico-Chemical Stabilization of Shales, SPE 37263; and Eric van Oort, et al., Manipulation of Coupled Osmotic Flows for Stabilization of Shales Exposed to Water-Based Drilling Fluids, SPE 30499. Jay P. Simpson, Studies of the Effects of Drilling Fluid/Shale Interactions on Borehole Instability, GasTIPS, 30, Spring 1997.

These authors/inventors posit that the economically devastating problem of shale instability—which is responsible for, among other things, stuck pipe due to well caving and collapse, cementing failures, and lost circulation—is caused by migration of low-solute fluid (i.e., the drilling fluid or "mud") into the surrounding shale. This movement occurs in response to a chemical potential gradient—i.e., the solvent in low-solute fluid moves to the high-solute fluid contained in the shale pore spaces. The result is that the shale surrounding the borehole can take up/absorb drilling fluid until it literally bursts—i.e., the outward stress exerted by the imbedded fluid overcomes the shale's intrinsic strength—with consequent problems for the contiguous wellbore. This unusual behavior of shale is a direct consequence of its ability to behave as a selectively permeable membrane (i.e., selectively permeable to water in preference to solutes).

U. S. Pat. No. 5,686,396 discloses a method for improving the osmotic efficiency of shale during the drilling process. More specifically, the method involves adding compositions to the drilling fluid so that the solute content of the drilling fluid more nearly matches that of the contiguous shale system. This way, the invasion of drilling fluid into the surrounding shale system is minimized. Again, the essential physico-chemical concepts relied upon by the inventors of the '396 patent are related to those relied upon in the present Invention; nevertheless, the application (drilling versus stimulation) and actual problem to be solved (keeping fluid out of the shale versus deliberately directing fluid into the shale) are drastically different. Therefore, the van Oort references, including the '396 patent, are directed to a different problem in an entirely different setting. Finally, the van Oort references only disclose (or suggest) exploiting indigenous membrane systems—none of these references teaches deliberately creating a capillary pressure gradient in the subsurface. The present Invention is directed in part to the creation of such systems.

More particularly, the phenomenon of capillary imbibition has been intensively studied by reservoir scientists to better understand hydrocarbon movement in the subsurface. See, e.g., C. J. Radke, et al., A Pore-Level Scenario for the Development of Mixed Wettability in Oil Reservoirs, SPE 24880. The physico-chemical principles that underlie the phenomenon is described for instance, in, R. Lenormand, et al., Modeling the Diffusion Flux Between Matrix and Fissure in a Fissured Reservoir, SPE 49007; and, C. Murat, et al., An Examination of Countercurrent Capillary Imbibition Recovery from Single Matrix Blocks and Recovery Predictions by Analytical Matrix/Fracture Transfer Functions, SPE 49005; both of these papers are hereby incorporated by reference in their entirety into the present Application, and in particular those portions of the papers discussing the general phenomenon of capillary imbibition. The concept of relative permeability also been applied to stimulation—the domain to which the present Invention is directed—though in a substantially different application, namely conformance control. Dalrymple, et al. in Results of Using a Relative-Permeability Modifier with a Fracture-Stimulation Treatment, SPE 49043, investigated a novel relative permeability modifier—actually generated in situ—to seal off zones from water intrusion while still permitting hydrocarbon flow (i.e., a disproportionate permeability reduction). The authors state that the mechanism by which the permeability modifier operates is based on lining the pore-throat regions, thereby acting as a brush or micro-valve, permitting hydrocarbon intrusion but not water movement. The Dalrymple paper is not directed to removing spent fracturing fluid (clean-up) but rather to conformance control.

SUMMARY IF THE INVENTION

Like the other inventions in this family of patent applications by Hinkel and England, the present Invention is a part of our broader program to devise novel means, premised on non-hydraulic mechanisms, to transfer fluid, particularly fracturing fluid, contained for instance, in a fracture tip, ultimately for the purpose of increasing fracture conductivity and therefore hydrocarbon production.

The present Invention is directed to increasing production of hydrocarbon (oil & gas) from underground wells. In particular, the present Invention fits within the group of techniques known as "stimulation." One stimulation technique is hydraulic fracturing, which involves pumping a fluid into the wellbore at sufficient pressures to actually fracture the formation and therefore increase the effective wellbore radius, which in turn will increase hydrocarbon production. The problem is that, quite ironically, the fluid used to fracture the formation remains in the fracture and acts as a barrier to putative hydrocarbon migrating into the fracture towards the wellbore. Hence, methods to remove this fluid—particularly that fraction that resides in the fracture tip (the region farthest away from the wellbore)—are of particular interest. Again, the conventional wisdom (as well as common sense) teaches that this recalcitrant fluid remaining in the fracture tip must be removed by somehow forcing it to flowback in the direction of the wellbore (along the length of the fracture) and where it can be recovered at the surface.

Generally, speaking, this method has not proven effective—as evidenced at least in part by the fact that the effective fracture length (fluid-free portion of the fracture) is about half of the actual fracture length is, in probably most cases. The present Invention is premised upon removing the spent fracturing fluid by transferring it transverse to the fracture, or parallel to the wellbore, into the adjacent fracture face. According to methods of the present Invention, the mechanism by which the fluid is transferred is capillary imbibition. To accomplish this, a capillary pressure gradient must be deliberately established—that is, a region of high capillary pressure juxtaposed with a region of low pressure. These two zones must be in contact, yet they must be immiscible; moreover, since it is desirable to move the fluid from the fracture into the formation, the region of high capillary pressure must reside in the formation, and the region of low pressure in the fracture.

The creation of two at least partially, immiscible phases to create a capillary pressure gradient is the signature of the invention. To do this in the case of a water-wet formation, involves pumping a (substantially) non-wetting fluid following by a (substantially) wetting fluid—so that they are at least partially immiscible. Immiscibility is essential to establish the gradient or discontinuity. Thus, the first fluid may be for instance, diesel oil that has been gelled so that is has sufficient viscosity to initiate and extend the fracture. At this point, a fracture treatment of the present Invention looks identical to an ordinary fracture treatment—indeed gelled oil is a common pad fluid, though it was much more common prior to water-based fluids, which are predominantly used today. As in an ordinary fracturing treatment, the pad fluid (in this case, gelled diesel oil) is designed to completely leak off into the formation; this complete leak-off coincides precisely with the termination of the proppant stages, or pumping a slurry containing proppant, so that the newly created fracture is propped open. For well treatments of the present Invention, the proppant slurry stage varies markedly from conventional treatments in that according to the present Invention, the proppant slurry stage is a wetting fluid—i.e., hence, an aqueous-based fluid, rather than a hydrocarbon-based fluid. According to conventional practice, the two types of fluids (hydrocarbon and aqueous) are not combined in a single treatment; in other words, the pad and proppant-slurry stages are conventionally either both aqueous or both non-aqueous. (Except that occasionally, small amounts of, e.g., diesel oil are added to an aqueous pad stage as a water control measure or for instance, the first stage might be foamed with $CO_2$ or $N_2$, followed by an aqueous-based proppant delivery fluid). Hence, the present Invention varies markedly from conventional treatments, not just in theory, but in actual practice.

The present Invention is based upon the following physico-chemical principles. Imagine a beaker filled three-quarters full with water. Next imagine that a hollow glass tube ("a capillary tube") open at both ends and having an inside diameter of about 0.1" is placed into the beaker near the center. What one would observe is that the water in the beaker would spontaneously enter the tube from the bottom and travel up the tube to a level higher than the water level in the beaker. This rise in height is due to the attractive forces—i.e., adhesion tension—between the tube and the water; in other words, the adhesion tension is the force that tends to pull the liquid up the wall of the tube. This phenomenon is known as capillary imbibition, and the difference between the water level in the beaker and the water level in the tube is a measure of the system's capillary pressure.

Next, suppose that a hollow glass sleeve is placed inside the capillary tube, so that the inside surface of the capillary tube is in contact with the outside surface of the sleeve (so that no fluid can enter the space between them). The effect of inserting the sleeve is to decrease the radius of the capillary tube. And the result of a decreased radius is that the water will rise to an even higher level in the capillary tube.

Thus, capillary imbibition is a phenomenon by which fluid can be moved. Hinkel and England have discovered that this principle can be exploited to transfer fracturing fluid from a subsurface fracture into the contiguous formation and therefore achieving fracture clean-up. The system of the present Invention thus can be viewed conceptually—though very crudely—as a means to "place the sleeve into the capillary tube " and thereby deliberately transfer fluid in the subsurface.

The basic equation describing capillary pressure is given below:

$$P_c = \frac{2\gamma_{lv}\cos\theta}{r_c}$$

where $P_c$ is the capillary pressure, which is the quantity which we wish to maximize; $\gamma_{lv}$ is the liquid-vapor interfacial tension, that is, it describes the tension between the liquid phase and the overlying contiguous phase; theta ($\theta$) is the angle formed between a horizontal reference and the meniscus; and $r_c$, is the radius of the capillary tube.

Therefore, one can readily observe that, as $r_c$ is decreased, then $P_c$, or the capillary pressure increases. Returning to the beaker model—decreasing the radius by inserting the sleeve increases $P_c$. From this equation, one can also see that as the interfacial tension between the two solid and liquid is increased, capillary pressure rises.

Returning to the beaker model, this system can be though of as having two separate capillary pressures. The beaker filled with water has a capillary pressure, which can be given by the formula above. This pressure is relatively low since $r_c$, or the radius of the beaker is "large." The capillary tube also has a capillary pressure that is much larger than the beaker's, due largely to its smaller radius. Thus, capillary imbibition can be though of as the result of bringing into contact two systems having unequal capillary pressures. The result is fluid movement—or imbibition—from the low-pressure system to the high-pressure system. The present Invention is a direct application of these principles in a subterranean environment.

A hydrocarbon-bearing formation in the subsurface consists of rock, such as sandstone that is permeable—that is, it has void spaces in which the oil resides. Looked at in cross section, a portion of the formation rock looks similar to a cross-section of a bundle of capillary tubes. Thus, one can imagine that the movement of hydrocarbon in a subterranean environment can be modeled as capillary bundles. And indeed, this is a common paradigm to model subsurface fluid movement.

The subsurface environment of interest is a fracture deliberately induced into the subsurface. This fracture—actually a large void in the formation—is saturated with fracturing fluid. In contact with that fracture is the hydrocarbon-bearing formation. To assist in understanding the Invention, the fracture can be though of as the beaker of water, the fracturing fluid as the water in the beaker, and the formation as the capillary tube. This analogy, though rough, is appropriate since the fracture is a large, essentially open fluid-containing reservoir, and the formation, as we have already discussed is frequently modeled as a bundle of capillary tubes.

To continue the analogy, we stated earlier that when two systems having unequal capillary pressure are brought into contact, the fluid will migrate from the low-pressure system to the high-pressure system—i.e., water will travel up the capillary tube. Thus, in the case of a fracture in the subsurface, the two systems are: (1) the fracture (the beaker) which is at very low capillary pressure since it essentially an "open" system like the beaker; and (2) the formation (the capillary tube). Empirically speaking, this pressure differential is insufficient to move fluid from the fracture into the formation. If it were, then fracture clean up would be routinely observed—but it is not. The pressure differential can be increased either by decreasing the capillary pressure of the fracture or by increasing the capillary pressure of the formation. According to the present Invention, if this pressure differential were increased—i.e., if the high-pressure system is made even higher pressure (like putting the sleeve inside the capillary tube)—then fluid will more readily flow from the fracture into the formation. Conceptually, this is like placing the sleeve inside the capillary tube—in effect, increasing capillary pressure by decreasing pore radius. This is done, in accordance with the present Invention by injecting into the formation, a non-wetting fluid, such as diesel fuel. This fluid coats the inside diameters of the rock pores, thus decreasing the inside diameters of the rock pores, and therefore increasing the capillary pressure of the system. Again, this system—the hydrocarbon-bearing formation—is in contact with the fracture, and therefore, the fracturing fluid will migrate, in response to the capillary pressure differential, from the low-pressure region (the fracture) to the high-pressure region (the formation). Thus, fracture clean-up can be achieved by transferring fluid from the fracture into the formation by capillary imbibition, which was achieved by creating then exploiting a capillary pressure gradient between the two subsurface phases in contact.

Referring now to FIG. 3, a tip region is shown at 48; this tip has stagnant fluid. First, a high-capillary pressure region A is created in the formation immediately adjacent to the fracture, by injecting the appropriate fluid into the wellbore and allowing it to flow into the fracture and eventually migrate from the fracture into the formation. The interface between the formation and the fracture is shown at 50. This interface divides two regions: a region A having an (artificially induced) region of high capillary pressure and a region B having low capillary pressure. They are in contact at this interface 50. A consequence of fluid contact between two regions having different capillary pressures (i.e., a capillary pressure discontinuity) is that fluid will migrate from the low-pressure region B to the high-pressure region A, according to the flow path 56. The fracture flows along the flowpath shown at 56. Again, this flowpath 56 for fracturing fluid removal is drastically different from the traditional flowpath depicting fluid removal of the prior art, shown at 58.

Again, the current state-of-the-art for removal of fracture fluids from a fracture (i.e., "fracture clean-up") teaches that the fluid must be removed through the same path through which the fluid came in: by traversing the entire length of the fracture (which in low-permeability formations may be over 1000 ft) then moving the fluid up the wellbore. Hence, regardless of the particular clean-up method employed, one feature common to all of those methods is that in every instance, the fluid is removed through the same path. The superficial appeal of this approach is difficult to argue with at first, since the fracture represents an open channel through which the fluid can move, and when the well is produced, fluid will travel naturally through the fracture towards the wellbore, up the wellbore, and to the surface.

The present Invention represents a drastic departure from this virtually uncontested orthodoxy. The essence of the present Invention is a method for removing the fracture fluid out of the fracture by deliberately directing or channeling the fluid towards the fracture face and into the formation. Conventional practice teaches that fouling of the fracture faces with fracture fluid ("fracture damage")—which contains, among other things, high molecular weight viscous organic polymers—is highly undesirable and should generally be avoided, and in no event intentionally induced. Put another way, the method of the present Invention is premised, in part, on an unusually counterintuitive insight—an insight that, until made, would discourage the skilled artisan from conceiving of the present Invention. This insight is that, in certain instances, for well productivity, increased effective fracture length is more important than the consequent formation damage, or loss in permeability of the fracture faces. In other words, the method of the present Invention will often result in deliberate damage to the fracture face, i.e., the fracture fluid residue ("filtrate") will plug portions of the face thus rendering it less permeable to hydrocarbons. Yet the present Invention is premised in part on the insight that, under certain conditions, decreased production due to fracture face damage is more than offset by increased production gained by increasing the effective fracture length (by removing fluid from the tip of the fracture).

Thus, according to the present Invention, while fracture face damage may lower permeability to hydrocarbon, and therefore inhibit production, the obverse benefit from moving the fluid into the fracture face is that the fluid is removed from the fracture itself, thus increasing the effective fracture length. This increase in effective fracture length can often enhance well production even accounting for the offset detriment of fracture face damage.

Therefore, the motivation to remove fracture fluid by intentionally directing it into the fracture faces is essentially absent in the art. Yet once that motivation is provided, what is needed is a cost-effective method to move the fluid into the fracture face. Thus the present Invention is directed to a method for removing the fracture fluid by forcing it into the fracture face. More specifically, the present Invention is directed to a method for fracture clean-up by creating and/or enhancing a capillary pressure gradient (or discontinuity) between the stagnant fracturing fluid remaining in the fracture and the pore fluid in the contiguous formation. This gradient, once created, is then exploited to transfer the fracturing fluid into the formation along the gradient.

One advantage of the present Invention is that it results in increased effective fracture length, which in turn means that the rate of production and the production capacity will be enhanced. The rate of production is increased due to the additional flowpaths available to the hydrocarbon; and the overall production capacity is increased due to the enlarged drainage area (the region within the hydrocarbon-bearing formation from which the hydrocarbon is effectively extractable).

A second advantage of the present Invention is that since the effective fracture length is increased, the drainage area concomitantly increases, which in turn means that less wells need to be drilled in order to recover a given amount of hydrocarbon from the formation.

DETAILED DESCRIPTION OF THE PREFERRED EMBODIMENTS

Figure 1:
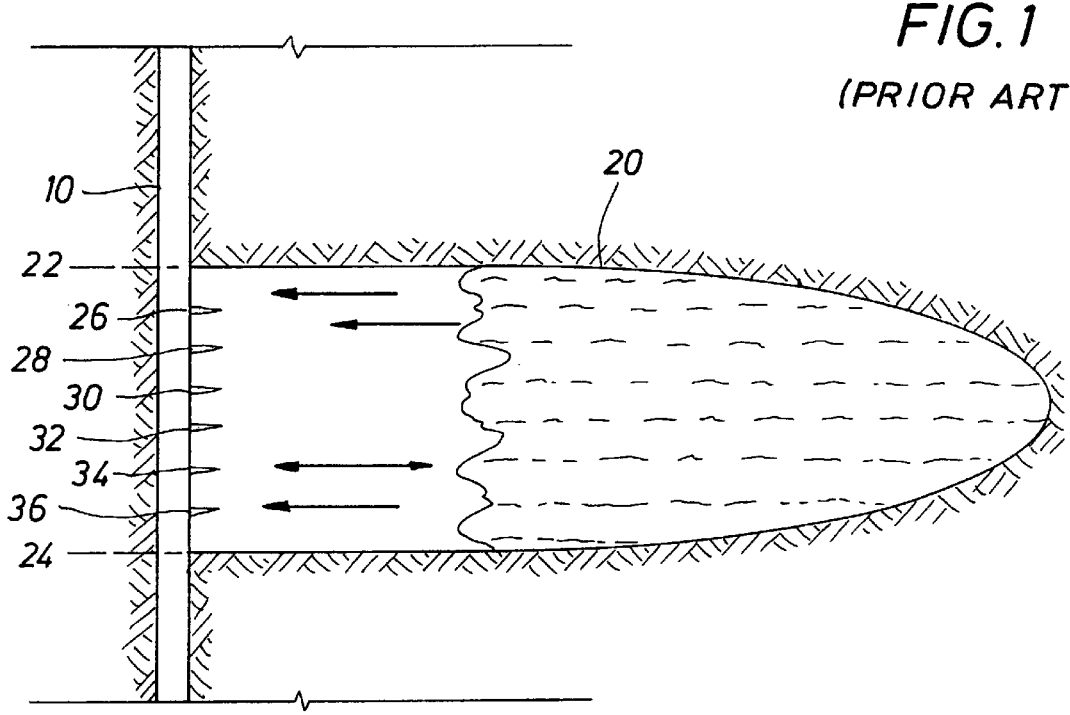
FIG. 1 depicts a stylized cross-sectional view of a typical fracture zone in a subsurface formation.
Figure 2:
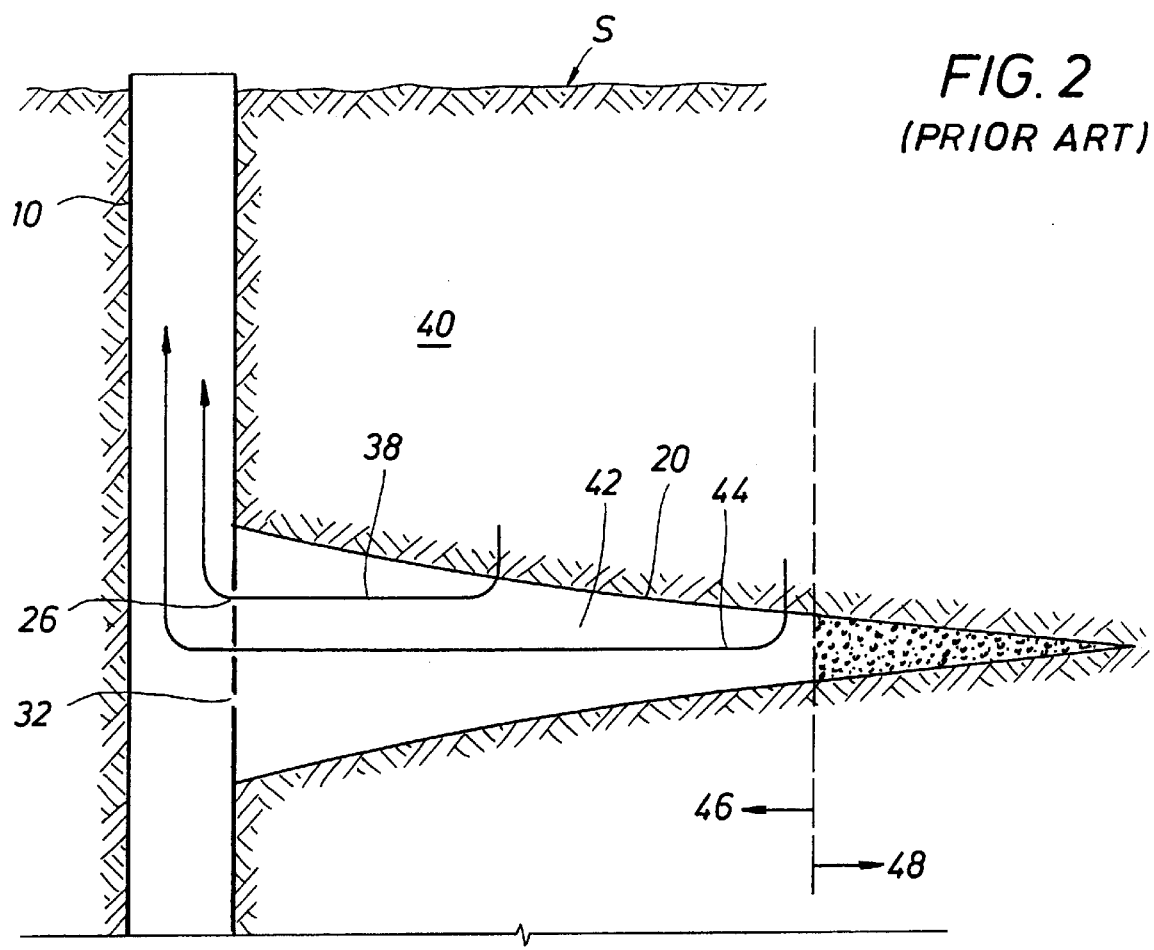
FIG. 2 depicts a cross-sectional view of a stylized fracture modified to show certain essential features of a typical fracturing operation.

Several preferred embodiments of the present Invention will now be described. The methods and compositions of the present Invention are conceptually inseparable, hence both will be discussed together.

Again, the essence of the present Invention is the deliberate transfer of selected components of a fluid from one discrete subterranean compartment to another by creating or enhancing a capillary pressure discontinuity by introducing a non-wetting fluid into the formation contiguous with and in contact with the fracture. Thus, the aqueous fracturing fluid will be imbibed by the high-capillary pressure region, therefore transferring fracturing fluid from the fracture and into the formation, and therefore increasing effective fracture length.

The method of the present Invention is readily operable without limitations as to the type of fracturing fluid or breaker. Virtually all fracturing fluids contain a carrier fluid which is conventionally an aqueous liquid, and a viscosifying polymer. The conventional hydratable polymers are: guar, hydroxypropyl guar, carboxymethyl guar, carboxymethylhydroxypropyl guar, hydroxyethyl cellulose, carboxymethylhydroxyethyl cellulose, hydroxypropyl cellulose, and xanthan and other synthetic polymers. Additionally, the fracturing fluid will generally also contain one or more additives such as surfactants, salts (e.g., potassium chloride) anti-foam agents, bactericides, and cross-linking agents for the polymeric thickener.

The method of the present Invention is also operable, for instance, with ClearFRAC™, a polymer-free fracturing fluid, developed and sold by Schlumberger Dowell. ClearFRAC is a Schlumberger trademark applied to viscoelastic surfactant-based fracturing fluids. Such viscoelastic surfactant-based fracturing fluids are disclosed and claimed in: U.S. patent application Ser. No. (unassigned) (Compositions Containing Aqueous Viscosifying Surfactants and Methods for Applying Such Compositions in Subterranean Formations), by Qu, et al., filed Feb. 23, 1999; U.S. patent application No. (unassigned) (Method of Fracturing Subterranean Formations), by Card, et al., filed Dec. 23, 1998; U.S. patent application Ser. No. 09/166,658 (Methods of Fracturing Subterranean Formations); U.S. patent application Ser. No. 08/865,137 (Methods for Limiting the Inflow of Formation Water and for Stimulating Subterranean Formations); U.S. Pat. patent application No. 08/727,877 (Elongated or Wormlike Micelles in Fracturing); U.S. Pat. No. 5,551,516 (Hydraulic Fracturing Process and Composition); and U.S. Pat. No. 5,258,137 (Viscoelastic Surfactant Based Foam Fluids).

Likewise, the method of the present Invention is readily operable without limitations as to the type of breaker. Again, breakers are added to the fracturing fluid mixture to "break" or destroy/diminish the viscosity of the fracturing fluid (the matrix carrying the proppant) so that this fluid is more easily recovered from the fracture during clean-up. Examples of breakers suitable for use in the method of the present Invention include enzymes (oxidizers and oxidizer catalysts). Additionally, the breakers can be encapsulated to delay their release, according to U.S. Pat. No. 4,741,401, herein incorporated by reference, issued to Walles, et al. and assigned to Schlumberger Dowell.

Despite the firm theoretical underpinning for the present Invention, and despite the prior studies demonstrating fluid movement in subsurface environments in response to other non-hydraulic means (e.g., drilling fluids into shales by osmotic flow), whether fracture clean-up can actually occur to any appreciable degree according to the present Invention is not obvious and has not to this point been demonstrated to a reasonable engineering probability to one skilled in the art. Obviously any computer simulation designed to model fluid movement in a fractured subsurface formation is only as reliable as the choice of value for the capillary imbibition flow parameter. Likewise, in laboratory experiments intended to demonstrate the efficiency of fracture fluid removal from a subsurface fracture are limited by the inability to reproduce actual subsurface conditions. Therefore, one generally preferred way to assess the efficiency with such a downhole technique is to rely upon a computer model which simulates—as much as possible— the real world conditions. Here, the flow parameter input into the model's algorithm (in this case, the parameter depicting flow attributable to capillary imbibition, or flow according to a capillary discontinuity) are determined by laboratory experiment then input into a numerical simulator of fracture clean-up.

Thus, the following examples are intended to further illustrate the present Invention—i.e., they demonstrate the effectiveness of the methods and compositions of the present Invention for removing fluid from a fracture tip. The examples that follow are separated into three sets. The first set depicts laboratory experiments designed to determine, among other things, realistic empirical parameters to describe flow due to capillary presssure, or fluid flow driven solely by a capillary pressure discontinuity. Once those parameters are determined by experiment, they are then incorporated into a simple mathematical model to mimic fluid removal from a fracture. This model is very simple and is based on parameters and equations well known to the skilled artisan. The model results predict the effectiveness of the present Invention in removing fluid from a fracture— again, based on experimentally derived values for the key parameter—flow due to capillary imbibition. These results are presented in the second example. Thus, the two examples taken together show the efficacy of the present Invention in a model environment intended to mimic actual subsurface conditions—the model simulates conditions in the subsurface, based on a realistic osmotic flow parameters determined experimentally. The third set of examples presents designs of fracturing treatments based on the present Invention.

Example 1

Determination of an Empirically Based Parameter for Fluid Flow Attributable to Capillary Pressure This Example records laboratory studies performed to determine a realistic parameter for the rate of fluid movement attributable to imbibition. Once this parameter is obtained, then it can be incorporated into a numerical simulator of fracture fluid movement. The output of these simulations is the total time require for a certain volume of fluid (e.g., fracturing fluid) to transfer from the fracture to the formation (i.e., "clean-up").

Figure 4:
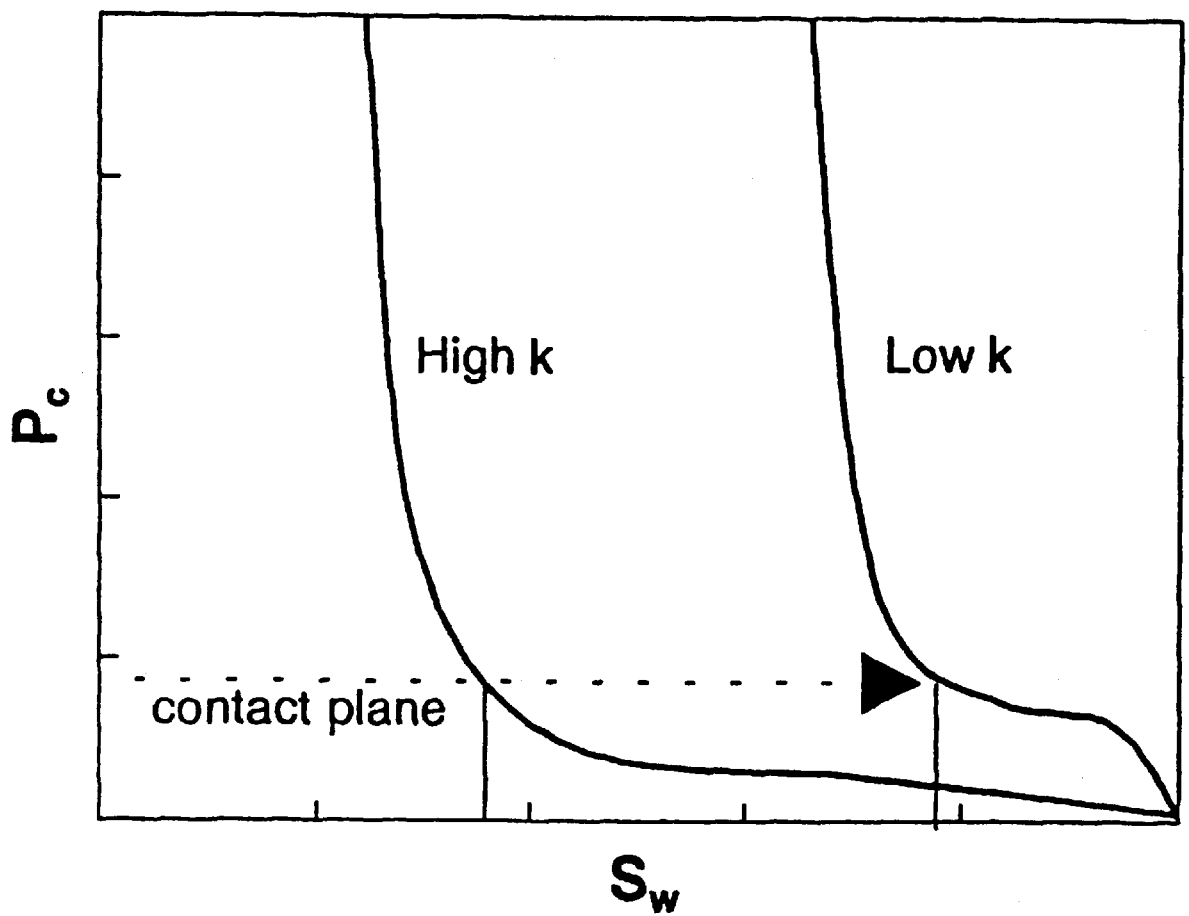
FIG. 4 shows data obtained from laboratory experiments conducted to obtain a velocity parameter for capillary imbibition. This parameter will be used to model subsurface fluid movement attributable to imbibition.

We conducted laboratory studies to determine the rate of water transport through porous media due to imbibition. Specifically, these studies involved monitoring the volume of nitrogen—i.e., the non-wetting fluid—displaced from an Ohio sandstone core, upon contact with water (the wetting fluid). The sandstone core was initially saturated with deionized water and then saturated with nitrogen by injecting the gas for two hours at 150 psi. The results are shown in FIG. 4.

These data show a delay of about 40 hours in water transport as it begins to invade the sandstone. These data also show that the rate of imbibition is relatively constant over the range of 50 to 1 10 hours and begins to plateau after about 110 hours. This plateau behavior is most likely due to the transport of sufficient water to equilibrate the capillary pressures of the wetting (water) and non-wetting (nitrogen). This plateau corresponds to the movement of 1.5 ml of water into the sandstone core; this represents less than about 2% of the total pore volume.

Finally, from these studies, a volume flux due to imbibition is obtained, which is 0.00045 cm/hr.

Example 2

Numerical Simulation of Fracture Fluid Clean-up Based on the Empirically Based Flow Parameter Having obtained this volume flux parameter, we now perform a numerical simulation of fracture clean-up (the movement of spent fracturing fluid out of the fracture and into the formation), based on the laboratory-derived parameter.

To ensure that the results from the computer simulation mimic as closely as possible, real-world conditions, the parameter used to describe flow due to capillary imbibition ($J_v$, the volume flux due to capillary pressure-induced flow)—the key parameter in the model—was obtained by laboratory experiment, according to Example 1. Put more simply, the study presented in this Example purports to answer the following question: having determined an experimentally based value for the capillary pressure flux, is this flux significant enough to actually move appreciable volumes of fluid from a subsurface fracture tip? Or: can the present Invention be employed to actually clean-up a fracture?

Thus, in the model described in this Example, the hydraulic (or D'Arcy) flow is set to zero—therefore any flow of the fracturing fluid held in the fracture must be due to capillary imbibition.

Figure 3:
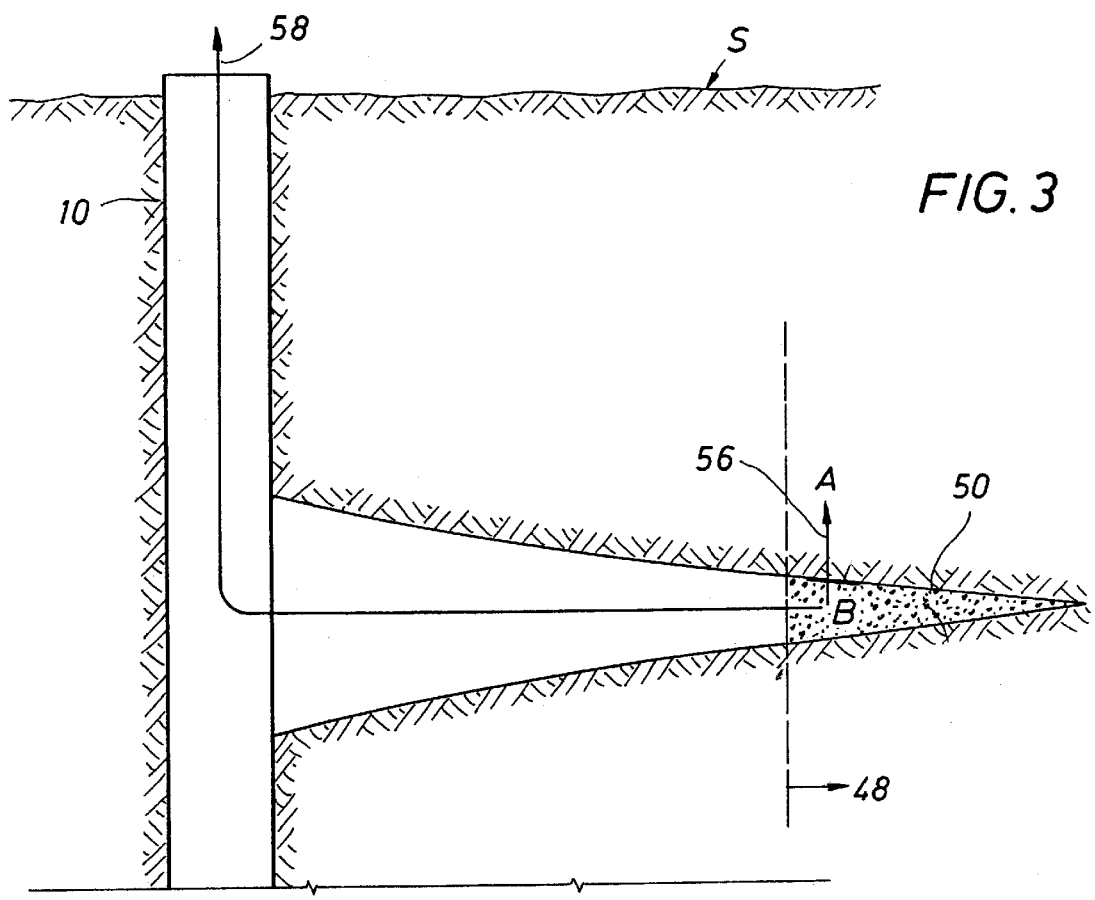
FIG. 3 depicts a cross-sectional view of a stylized fracture modified to show certain essential features of the present Invention.

Referring again to FIG. 3, the fracture tip, 48—i.e., the distal portion of the fracture hydraulically isolated from the remainder of the fracture and thus retaining stagnant fracturing fluid that prevents the flow of hydrocarbon through that portion of the fracture—is the portion of the fracture from which it is desired to remove fluid.

The constant parameters input into the computer simulation are: fracture height (100 ft.), length (1000 ft.), fracture vertical width (0.2 in.); and permeability (8 millidarcy). Each of the values mimics real-world values. The left-most column of Table 1 recites different intervals of the total fracture length in 50 ft intervals—from 0 (at the wellbore) to 1000 ft., the distal-most portion of the fracture. Thus, the entire fracture is, in this computer simulation, discretized into 50 ft. cells. The next column gives the fracture width side-to-side (this is assumed to diminish with increasing distance from the wellbore). The next column calculated from the following equations:

$$V = del\ x * h * w_{ave}$$

where del x is the length of the differential fracture portion (in these calculations always equal to 50 ft.), $w_{ave}$ is the average width over the length of that portion of the fracture, and h is the fracture height. "V" represents the volume of fluid removed from that 50 ft. portion of the fracture—the total volume is shown at the bottom of each column. The rows from 650 ft.—1000 ft are intended to represent the fracture tip—i.e., that portion of the fracture from which it is difficult to remove the fracture fluid, due to the distance from the wellbore and due to the hydraulic isolation of that portion of the fracture. Thus, the numbers inside the box are intended to indicate the efficacy of the present Invention in removing fluid from the fracture tip. The two final columns display the time that it takes to remove the fluid in that portion of the fracture to the immediate left (assuming this entire fracture volume were completely filled with fluid).

In a separate set of experiments, plausible rates for diffusion were determined by conventional laboratory methods. The purpose of this experiment was to verify that diffusion would occur quickly enough relative to the experimentally determined capillary imbibition rate—in a typically subsurface environment. If solute diffusion occurs too slowly, then a solute-depleted region will occur near the interface—this local gradient near the interface is far less than the overall gradient beyond the region immediately adjacent to the interface. Experiments performed in connection with this Patent Application have determined that in fact, diffusion is much faster than the rate of capillary imbibition, and therefore the solute gradient is quickly reestablished or replenished at the interface as the solute concentration is depleted by the transfer of water from the fracture.

Thus, (referring to Table 1) at fracture cell, 650–700 ft., 1309 liters of fluid were removed (from the fracture into the contiguous formation) in a little over 14 days. The time is calculated using the following equation:

$$t = V/Q = V/(2 * Ac'* J_v) = V/(2 * del\ x * h * J_v)$$

$J_v$ is the volume flux—i.e., that parameter obtained from the laboratory experiments in Example 1above.

Also, according to Table 1, it took 5.63 days to remove all of the fluid remaining in the distal-most tip of the fracture (950–1000 ft.). Again, this number represents the migration of fracturing fluid from the fracture tip into the adjacent formation—and this fluid movement is due solely to a capillary imbibition, since the other flow term, hydraulic flow, is set to zero. Therefore, the data presented in Table 1 demonstrates to one skilled in the art that capillary imbibition, if properly exploited, is a significant source of the total flow in a subsurface fracture environment—as evidenced by the fact that, for instance, the last 100 ft. of the fracture was cleaned-up—i.e., the stagnant fracturing fluid was completely removed from the fracture into the formation by osmotic flow—in about two weeks hours. To one skilled in the art, this number is significant since fracture clean-up can take days, or weeks, or months—and even after that period of time, the fluid in the tip is still not removed. Thus, the present Invention is a viable system for removing stagnant fracturing fluid from a subsurface fracture.

The efficacy and reliability of the method and composition of the present Invention must be verifiable by the on-site petroleum engineer and other on-site personnel skilled in well stimulation. Indeed, this is easily accomplished by several means. For instance, the present Invention will result in increased fluid removal from the fracture, and therefore, increased effective fracture length. Thus conventional techniques used to measure effective fracture length can be employed to assess the efficacy of the method and composition of the present Invention. Such methods include pressure transient analysis. The effective fracture length can be compared with the actual fracture length determined by standard fracture geometry models.

Again, in this numerical study, the only source of fluid transport is imbibition. No other sources of fluid movement are considered—e.g., hydraulic means, osmosis, etc.

TABLE 1

Numerical Simulation of Fluid Movement Based on a Laboratory-Derived Velocity Parameter for Imbibition

| fracture length segment (ft) | fracture width (in) | volume of fluid (ml) | time (hr) | time (days) |
|---|---|---|---|---|
| 0 | 0.200 | — | — | |
| 50 | 0.194 | 2,323,991 | 608.16 | 25.34 |
| 100 | 0.188 | 2,251,713 | 589.24 | 24.55 |
| 150 | 0.181 | 2,177,852 | 569.91 | 23.75 |
| 200 | 0.175 | 2,102,280 | 550.14 | 22.92 |
| 250 | 0.168 | 2,024,850 | 529.87 | 22.08 |
| 300 | 0.161 | 1,945,391 | 509.08 | 21.21 |
| 350 | 0.154 | 1,863,703 | 487.70 | 20.32 |
| 400 | 0.147 | 1,779,552 | 465.68 | 19.40 |
| 450 | 0.140 | 1,692,654 | 442.94 | 18.46 |
| 500 | 0.132 | 1,602,677 | 419.40 | 17.47 |
| 550 | 0.124 | 1,509,168 | 394.40 | 16.46 |
| 600 | 0.115 | 1,411,623 | 369.40 | 15.39 |
| 650 | 0.107 | 1,309,341 | 342.64 | 14.28 |
| 700 | 0.097 | 1,201,398 | 314.39 | 13.10 |
| 750 | 0.087 | 1,086,510 | 284.32 | 11.85 |
| 800 | 0.076 | 962,785 | 251.95 | 10.50 |
| 850 | 0.064 | 827,213 | 216.47 | 9.02 |
| 900 | 0.050 | 674,370 | 176.47 | 7.35 |
| 950 | 0.033 | 491,903 | 128.72 | 5.36 |
| 1000 | 0.00 | 195,538 | 51.17 | 2.13 |
| | | 29434502 | 385.13 | 16.05 |

As evidenced by Table 1, about 14 days is required to remove fluid from this fracture tip, provided that the only movement is due to capillary imbibition.

Example 3
Preferred Fracture Treatment Design

In Example 1, we obtained a laboratory-based flow parameter for capillary imbibition. In Example 2, we used that parameter in a numerical simulator of fluid movement in a fracture to model fracturing fluid clean-up. These examples demonstrate that fracturing treatments could be designed in accordance with the present Invention. Those treatment designs are presented in this Example.

In each example, we assume that the formation is a water-wet formation, as in fact most are. A typical hydraulic fracturing treatment can be conveniently divided into three phases: (1) the pad stage; (2) the proppant slurry stage; and (3) a flush. In a typical fracturing treatment, a pad fluid is first pumped—the purpose is to initiate and propagate (extend) the fracture. A second purpose (not always desired or achieved) is to seal the fracture face to prevent fluid loss as additional fluid is pumped into the fracture during later stages. Generally, though not always, the pad is pumped in a single stage. Next, the proppant slurry stages are pumped. This phase is generally divided into several stages—each stage characterized by different volumes an different proppant concentrations. Finally, a flush is performed, which is generally just a single stage.

In the case of the present Invention (again, assuming a water-wet formation) the pad stage is a non-wetting fluid and the proppant stages are wetting fluids. By contrast, conventional fracturing treatments are performed using either wetting fluids as the pad and proppant slurry stages, or conversely, both phases are non-wetting fluids. Fracturing treatments designed according to the present Invention are comprised of a non-wetting pad and wetting proppant slurry.

The idea behind this unusual design is to establish a capillary pressure gradient at the fracture face (defined by the formation on one side and the open fracture on the other). Such a gradient is established by, for instance, injecting a non-wetting pad fluid, which then leaks off into the formation, followed by injection of the wetting proppant slurry. These two immiscible phases create the desired gradient.

Below in Tables 1–3, are three exemplary fracture treatment designs. In the first column, the name given to the stage is recited; in the second column is listed the fluid type; and in the third and fourth columns are the fluid volumes and proppant concentrations for that particular stage. The key to designing fracture treatments in accordance with the present Invention lies in creating the capillary pressure gradient. To do this, the pad (which leaks off, hence ultimately resides in the formation contiguous to the fracture) and the proppant slurry must be immiscible. In the case of a water-wet formation, ideal pad fluids are gelled oil, such as Schlumberger's YF GO III™. YF GO III is a gelled oil based fluid, originally designed for treatment of water-sensitive formations. To prepare YF GO III, a gelling agent and an activator solution made up of a pH control agent and crosslinker are added to the base fluid (e.g., oil diesel, kerosene, condensate, as well as a wide variety of crude oils). If YF GO III is used as the pad fluid, then the proppant slurry stages are comprised of, preferably guar or guar-based (e.g., HPG or CMHPG) fluids, whether cross-linked or not. Generally, treatment designs of the present Invention can comprise conventional additives (e.g., bactericides, breakers, clay stabilizers); however, additives such as surfactants should generally be avoided since they might compromise the immiscibility of the two phases. In general, this should be the test to assess whether any additive should be used in fracture treatments of the present Invention. Similarly, it may be undesirable to add fluid-loss control agents—e.g., fine-mesh sand, silica flour, etc.—that form a filter cake across the fracture-formation interface and also interfere with fluid transfer.

TABLE 1

Treatment Design #1

| Stage Name | Fluid Type | Volume (gal) | Proppant concentration (lb/gal) |
|---|---|---|---|
| pad | diesel oil, gelled | 50,000 | 0 |
| proppant slurry 1 | guar polymer-based fluid | 5,000 | 1 |
| proppant slurry 2 | guar polymer-based fluid | 7,000 | 2 |
| proppant slurry 3 | guar polymer-based fluid | 10,000 | 3 |
| proppant slurry 4 | guar polymer-based fluid | 12,000 | 4 |
| proppant slurry 5 | guar polymer-based fluid | 15,000 | 5 |
| proppant slurry 6 | guar polymer-based fluid | 13,000 | 6 |
| flush | guar polymer-based fluid | 5,6000 | 0 |

TABLE 2

Treatment Design #2

| Stage Name | Fluid Type | Volume (gal) | Proppant concentration (lb/gal) |
|---|---|---|---|
| pad | YF GO III | 50,000 | 0 |
| proppant slurry 1 | cross-linked CMHPG | 5,000 | 1 |
| proppant slurry 2 | cross-linked CMHPG | 7,000 | 2 |
| proppant slurry 3 | cross-linked CMHPG | 10,000 | 3 |
| proppant slurry 4 | cross-linked CMHPG | 12,000 | 4 |
| proppant slurry 5 | cross-linked CMHPG | 15,000 | 5 |
| proppant slurry 6 | cross-linked CMHPG | 13,000 | 6 |
| flush | CMHPG | 5,6000 | 0 |

TABLE 3

Treatment Design #3

| Stage Name | Fluid Type | Volume (gal) | Proppant concentration (lb/gal) |
|---|---|---|---|
| pad | diesel oil, gelled | 30,000 | 0 |
| pad | YF GO III | 20,000 | 0 |
| proppant slurry 1 | cross-linked HPG | 5,000 | 1 |
| proppant slurry 2 | cross-linked HPG | 7,000 | 2 |
| proppant slurry 3 | cross-iinked HPG | 10,000 | 3 |
| proppant slurry 4 | cross-linked HPG | 12,000 | 4 |
| proppant slurry 5 | cross-linked HPG | 15,000 | 5 |
| proppant slurry 6 | cross-linked HPG | 13,000 | 6 |
| flush | CMHPG | 5,6000 | 0 |

The preceding discussion was intended to describe several preferred embodiments of the present Invention. The skilled artisan will no doubt realize that various modifications to the methods and compositions described above may be effected without departing from the basic concepts and principles of the present Invention. Thus, changes of this type are deemed to lie within the spirit and scope of the Invention; the present Invention is limited only by the claims that follow.

Having thus described the invention, what is claimed is:

1. A method of removing an initially resident wetting fluid from a fracture contiguous to a geologic formation in a subsurface environment, said method comprising the steps of:

creating or enhancing a capillary pressure gradient at an interface, said interface defined by said fracture on one side and said contiguous formation on another side; said capillary pressure gradient being created by injecting a non-wetting fluid, into the formation opposite said fracture; and allowing said initially resident wetting fluid to flow along said gradient, through said interface, from said fracture into said formation.

2. The method of claim 1 wherein said capillary pressure gradient is created by:

injecting into said formation, a non-wetting fluid, said non-wetting fluid creating a fracture in said formation thereafter migrating to said formation opposite said fracture; and injecting into said fracture, a wetting fluid at least partially immiscible with said non-wetting fluid, said wetting fluid initially resident in said fracture opposite said formation.

3. The method of claim 2 wherein said non-wetting fluid is selected from the group consisting of gelled diesel oil, gelled lease oil, gelled kerosene, gelled crude oil, carbon dioxide, nitrogen, and water to which a surfactant has been added.

4. The method of claim 3 wherein said wetting fluid is comprised of a polymer selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, and xanthan and synthetic polymers.

5. The method of claim 4 wherein said wetting fluid is cross-linked.

6. The method of claim 5 wherein said wetting fluid contains a breaker to degrade said polymer.

7. The method of claim 2 wherein said formation is oil-wet, and further comprising a first step of injecting into said formation, material to substantially reverse the wetting characteristics of a portion of said formation contiguous to said fracture.

8. The method of claim 7 wherein said material consists substantially of at least one surfactant.

9. The method of claim 7 wherein said material comprises an oxidizer.

10. The method of claim 1 wherein said wetting and non-wetting fluids are two immiscible fluids in contact with one another, that define said interface.

11. The method of claim 10 wherein said two immiscible fluids are diesel oil and a hydrated polymer-based fluid.

12. The method of claim 1 wherein said formation is oil-wet, and wherein said capillary pressure gradient is created by:

injecting into said formation, a non-wetting fluid, said non-wetting fluid creating a fracture in said formation thereafter migrating to said formation opposite said fracture; and injecting into said fracture, a wetting fluid, said wetting fluid at least partially immiscible with said non-wetting, and said wetting fluid initially resident in said fracture opposite said formation.

13. A method for stimulating hydrocarbon in a water-wet subterranean formation by creating or extending a fracture in said formation, comprising the steps of:

injecting a non-wetting fluid into a subsurface formation, from a well in fluid engagement with said formation and a well surface;

allowing said non-wetting fluid to leak off from said fracture into said formation;

injecting an aqueous-based proppant-containing slurry from said well into said fracture, said slurry initially resident in said fracture; and allowing said slurry to migrate from said fracture into said formation.

14. The method of claim 13 wherein said non-wetting fluid is selected from the group consisting of gelled diesel oil, gelled lease oil, gelled kerosene, gelled crude oil, carbon dioxide, and nitrogen.

15. The method of claim 13 wherein said slurry is comprised of a polymer selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, and xanthan and synthetic polymers.

16. A method for fracturing a subterranean formation the steps of:

injecting a gelled hydrocarbon-based fluid from a well in fluid engagement with said formation, into said formation for the purpose of creating or extending a fracture in said formation;

allowing said hydrocarbon-based fluid to leak off from said fracture into said formation;

injecting a substantially aqueous-based fluid from a well in fluid engagement with said formation, into said fracture, thereby establishing a capillary pressure at an interface, said interface defined by said fracture and said formation contiguous with said fracture; and allowing said aqueous-based fluid to migrate, through said interface, from said fracture into said formation in response to said capillary pressure gradient.

17. The method of claim 16 wherein said aqueous-based fluid is comprised of a hydrated polymer.

18. The method of claim 17 wherein said gelled hydrocarbon-based fluid is gelled diesel oil.

19. The method of claim 18 wherein said aqueous-based fluid and said gelled hydrocarbon-based fluid are partially immiscible.

20. The method of claim 17 wherein said hydrated polymer is co-injected with proppant, and further wherein said polymer and said proppant are injected in a plurality of stages, each stage characterized by a different total volume and/or a different proppant concentration or proppant type.

21. The method of claim 20 wherein said aqueous-based fluid and said gelled hydrocarbon-based fluid are substantially immiscible.

22. The method of claim 16 wherein said aqueous-based fluid consists essentially of at least one viscoelastic surfactant.

* * * * *